(12) United States Patent
Kim

(10) Patent No.: US 12,154,748 B2
(45) Date of Patent: Nov. 26, 2024

(54) POWER DEVICE FOR CONTINUOUSLY DETECTING ENTRANCE AND EXIT POSITIONS

(71) Applicant: LS ELECTRIC CO., LTD., Anyang-si (KR)

(72) Inventor: Young Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 112 days.

(21) Appl. No.: 17/916,705

(22) PCT Filed: Mar. 29, 2021

(86) PCT No.: PCT/KR2021/003866
§ 371 (c)(1),
(2) Date: Oct. 3, 2022

(87) PCT Pub. No.: WO2021/201536
PCT Pub. Date: Oct. 7, 2021

(65) Prior Publication Data
US 2023/0154696 A1    May 18, 2023

(30) Foreign Application Priority Data
Apr. 3, 2020  (KR) .................. 10-2020-0041155

(51) Int. Cl.
*H01H 9/02*    (2006.01)
*H01H 9/54*    (2006.01)

(52) U.S. Cl.
CPC .............. *H01H 9/54* (2013.01); *H01H 9/02* (2013.01)

(58) Field of Classification Search
CPC .. H01H 9/54; H01H 9/02; H01H 3/16; H01H 33/02; H01H 71/0207; H01H 9/20; H01H 9/22; H01H 71/10; H02B 11/10; H02B 11/127; H02B 1/0523; H02B 11/167;
(Continued)

(56) References Cited

U.S. PATENT DOCUMENTS

| 6,559,394 B2 | 5/2003 | Yang |
| 9,673,595 B2 | 6/2017 | Benke et al. |
| 2002/0079201 A1 | 6/2002 | Yang |

(Continued)

FOREIGN PATENT DOCUMENTS

| CN | 101982736 A | 3/2011 |
| CN | 102820164 A | 12/2012 |

(Continued)

OTHER PUBLICATIONS

Supplementary Search Report for related European Application No. 21779908.9; action dated Aug. 29, 2023; (10 pages).
(Continued)

*Primary Examiner* — Ahmed M Saeed
(74) *Attorney, Agent, or Firm* — K&L Gates LLP

(57) ABSTRACT

The present disclosure relates to a power device for continuously detecting entrance and exit positions, the power device comprising: a cradle having a cradle terminal formed on the rear side; a circuit breaker mechanically and electrically connected to or disconnected from the cradle terminal; and a position detection means which is mounted inside the circuit breaker and detects the position of a body of the circuit breaker in real time.

6 Claims, 10 Drawing Sheets

(58) Field of Classification Search
CPC .......... H02B 11/133; H02B 1/04; H02B 1/30; H02B 11/173; H02B 11/26
See application file for complete search history.

(56) References Cited

U.S. PATENT DOCUMENTS

| | | | |
|---|---|---|---|
| 2010/0163378 A1* | 7/2010 | Kim | H02B 11/10 |
| | | | 200/308 |
| 2015/0114807 A1 | 4/2015 | Benke et al. | |
| 2017/0237241 A1 | 8/2017 | Benke et al. | |
| 2018/0145487 A1 | 5/2018 | Kini et al. | |

FOREIGN PATENT DOCUMENTS

| | | |
|---|---|---|
| CN | 104600616 A | 5/2015 |
| CN | 206211367 U | 5/2017 |
| CN | 107275970 A | 10/2017 |
| CN | 109861125 A | 6/2019 |
| JP | 2002209312 A | 7/2002 |
| JP | 2014143867 A | 8/2014 |
| KR | 200462421 Y1 | 9/2012 |
| KR | 20130000281 A | 1/2013 |
| KR | 101272305 B1 | 6/2013 |
| KR | 20-2014-0002079 A | 3/2014 |
| KR | 20180117457 A | 10/2018 |
| KR | 20190113132 A | 10/2019 |

OTHER PUBLICATIONS

Japanese Office Action for related Japanese Application No. 2022-558205; action dated Dec. 5, 2023; (5 pages).
International Search Report for related International Application No. PCT/KR2021/003866; action dated Oct. 7, 2021; (6 pages).
Written Opinion for related International Application No. PCT/KR2021/003866; action dated Oct. 7, 2021; (3 pages).
Office Action for related Chinese Application No. 202180025687.2; action dated Jun. 28, 2024; (12 pages).

* cited by examiner

POWER DEVICE FOR CONTINUOUSLY DETECTING ENTRANCE AND EXIT POSITIONS

CROSS-REFERENCE TO RELATED APPLICATION

The present application is a National Stage of International Application No. PCT/KR2021/003866 filed on Mar. 29, 2021, which claims priority to and the benefit of Korean Utility Model Application No. 10-2020-0041155, filed on Apr. 3, 2020, the disclosure of which is incorporated herein by reference in its entirety.

FIELD

The present disclosure relates to a power device for continuously detecting extended and retracted positions of a circuit breaker body, and more specifically to a power device for continuously detecting accurate extended and retracted positions of a circuit breaker body moving in a cradle.

BACKGROUND

In general, a power device refers to any device that may receive and transmit power and convert the power.

FIG. 1 is a perspective view showing a conventional power device.

Referring to FIG. 1, the conventional power device includes a cradle terminal 110 connected to a power line connected to an external power source or a load. Further, the power device includes a cradle 100 fixed to a switchboard, a circuit breaker body 200 mechanically and electrically connected to or disconnected from the terminal 110 of the cradle 100, and a girder 300 and a truck 400 to bring the circuit breaker body 200 to a contact or disconnection position in which the body is mechanically and electrically connected to or disconnected from the terminal 110 of the cradle 100.

In this regard, the contact position means a position in which the circuit breaker body 200 approaches the cradle terminal 110 at the maximum level and electrically contacts the terminal 110.

Further, the disconnection position means a position in which the circuit breaker body 200 is spaced from the cradle terminal 110 by the maximum spacing and thus is electrically disconnected from the cradle terminal 110.

Further, a test position means a position corresponding to a process in which the body is being displaced from the contact position to the disconnection position or from the disconnection position to the contact position.

Further, FIG. 2 and FIG. 3 are perspective views showing the girder 300 and the truck 400 according to the disconnection position and the contact position in FIG. 1, respectively.

Further, (a), (b), and (c) of FIG. 4 are cross-sectional views of the girder 300 and the truck 400 according to disconnection, test, and contact positions in the conventional power device, respectively.

Referring to FIGS. 2 to 4, in the conventional power device, the girder 300 includes a pair of handle bars 310 formed on a front face thereof, support ribs 320 respectively formed at both opposing sides thereof, and a spindle 330 having one end rotatably coupled to a center of the front face thereof, and a switch actuation bar 340 formed on one side of the spindle 330.

Further, the truck 400 includes a plurality of wheels 410 formed at each of both opposing sides thereof and a plurality of micro switches 420 actuated by the switch actuation bar 340. As the spindle 330 rotates, a spacing between the truck 400 and the girder 300 is adjusted as shown in FIGS. 2 and 3.

That is, as the spindle 330 rotates clockwise or counterclockwise, the spacing between the truck 400 and the cradle terminal 110 is adjusted.

Further, the switch actuation bar 340 includes an elongate groove 341 formed to correspond to a movement range of the truck 400, a rear end inclined portion 342 formed at one end of the groove 341, and a top planar portion 343 constituting a top face except for the groove 341 and the rear end inclined portion 342.

Further, the micro switch 420 includes first to third micro switches 421, 422, and 423.

In more detail, the first micro switch 421 includes a first contact lever 421a formed on a bottom thereof so as to contact the switch actuation bar 340, and is closest to the girder 300.

Further, the second micro switch 422 includes a second contact lever 422a formed on a bottom thereof so as to contact the switch actuation bar 340, and is adjacent to a rear end of the first micro switch 421.

Further, the third micro switch 423 includes a third contact lever 423a formed on a bottom thereof so as to contact the switch actuation bar 340, and is adjacent to a rear end of the truck 400.

A method for detecting a relative position between the terminal 110 of the cradle 100 and the circuit breaker body 200 using the truck 300 in this conventional power device is as follows.

Referring to (a) of FIG. 4, the spacing between the truck 400 and the girder 300 becomes minimum at the disconnection position of the conventional power device.

Accordingly, the distance between the circuit breaker body 200 and the cradle terminal 110 becomes maximum.

Further, the first contact lever 421a is in contact with the top planar portion 343, while each of the second contact lever 422a and the third contact lever 423a is in contact with the groove 341.

Further, referring to (b) of FIG. 4, at the test position of the conventional power device, as the spacing between the girder 300 and the truck 400 increases, each of the first contact lever 421a and the second contact lever 422a comes into contact with the groove 341.

Further, the third contact lever 423a passes by the rear end inclined portion 342 and then comes into contact with the top planar portion 343.

Further, referring to (c) of FIG. 4, at the contact position of the conventional power device, the spacing between the truck 400 and the girder 300 becomes maximum.

Accordingly, the circuit breaker body 200 is in contact with and thus electrically connected to the cradle terminal 110.

At this time, the first contact lever 421a comes into contact with the groove 341, and the second contact lever 422a passes by the rear end inclined portion 342 and comes into contact with the top planar portion 343.

As described above, in the prior art, the spacing the truck 400 and the girder 300 is adjusted in a state in which the switch actuation bar 340 is coupled to the girder 300. Thus, the position of the circuit breaker body 200 is detected based on whether the plurality of micro switches 420 fixedly installed on the truck 400 are in contact with the switch actuation bar 340.

Accordingly, in the prior art, the position of the circuit breaker body 200 may be detected at each of the disconnection, test, and contact positions of the power device. However, a varying distance between the circuit breaker body 200 and the cradle terminal 110 cannot be detected.

That is, according to the prior art, there is a problem that the position of the circuit breaker body 200 cannot be continuously detected.

Further, in the prior art, as physical contact between the micro switch 420 and the switch actuation bar 340 is continuously made in order to detect the position of the circuit breaker body 200, deformation to or damage to a coupling portion between the micro switch 420 and the truck 400 may frequently occur.

Accordingly, in the related art, the position of the circuit breaker body 200 cannot be accurately detected due to frequent occurrence of the deformation of or the damage to the coupling portion between the micro switch 420 and the truck 400.

SUMMARY

A purpose of the present disclosure is to provide a power device for continuously detecting accurate extended and retracted positions of a circuit breaker body over an entirety of a movement range.

Purposes according to the present disclosure are not limited to the above-mentioned purpose. Other purposes and advantages according to the present disclosure that are not mentioned may be understood based on following descriptions, and may be more clearly understood based on embodiments according to the present disclosure.

Further, it will be easily understood that the purposes and advantages according to the present disclosure may be realized using means shown in the claims and combinations thereof.

In order to achieve the purpose, the present disclosure provides a power device for continuously detecting extended and retracted positions of a circuit breaker body, the device comprising: a cradle having a cradle terminal formed on a rear face thereof; a circuit breaker mechanically and electrically connected to or disconnected from the cradle terminal; and position detecting means mounted inside the circuit breaker so as to detect the position of the circuit breaker body in real time.

More specifically, the position detecting means may include: a position bar including at least one position detected area portion corresponding to a movement range of the circuit breaker body, wherein the position bar has one end coupled to a girder fixedly installed on a front face of the cradle, and the other end as a free end facing a rear side of the cradle; and a sensor module installed inside a truck, wherein the circuit breaker body is loaded on the truck, and the position bar is inserted into the truck, wherein the truck is configured to reciprocate from the girder to the cradle terminal and inside the cradle, wherein the sensor module includes at least one sensor facing the position detected area portion.

Further, the position detected area portion may include at least one: at least one position sticker having a shade varying in a longitudinal direction of the position bar; at least one position inclined portion inclined downwardly or upwardly in the longitudinal direction of the position bar: or a plurality of groups of position protrusions arranged in the longitudinal direction of the position bar, wherein each group is composed of position protrusions arranged in a width direction of the bar, wherein numbers or formation positions of the position protrusions in the different groups are different from each other.

Further, the at least one sensor may include at least one of a non-contact type sensor or a contact type sensor, or includes a non-contact type sensor and a contact type sensor and thus includes at least two sensors.

Further, a position sun gear may be formed on and along one side face of the position bar, wherein the truck may receive therein a rotary gear rotating while being in engagement with the position sun gear, wherein the device may further comprise a sensor for sensing a number of rotations or a rotation angle of the rotary gear and for determining the position of the circuit breaker based on the sensed number or angle.

Further, the truck may receive therein at least one position bar guide adjacent to or in contact with each of both opposing sides of the position bar, wherein the position bar guide may include a position bar cleaner constructed to remove dust or foreign substances deposited on the position detected area portion.

According to the present disclosure, the device may linearly detect the position of the circuit breaker over the entirety of the movement range such that the accurate position of the circuit breaker may be detected in real time.

Further, according to the present disclosure, the physical contact between the components in order to detect the position of the circuit breaker may be minimized, thereby improving durability of the power device.

DETAILED DESCRIPTION

Figure 1:
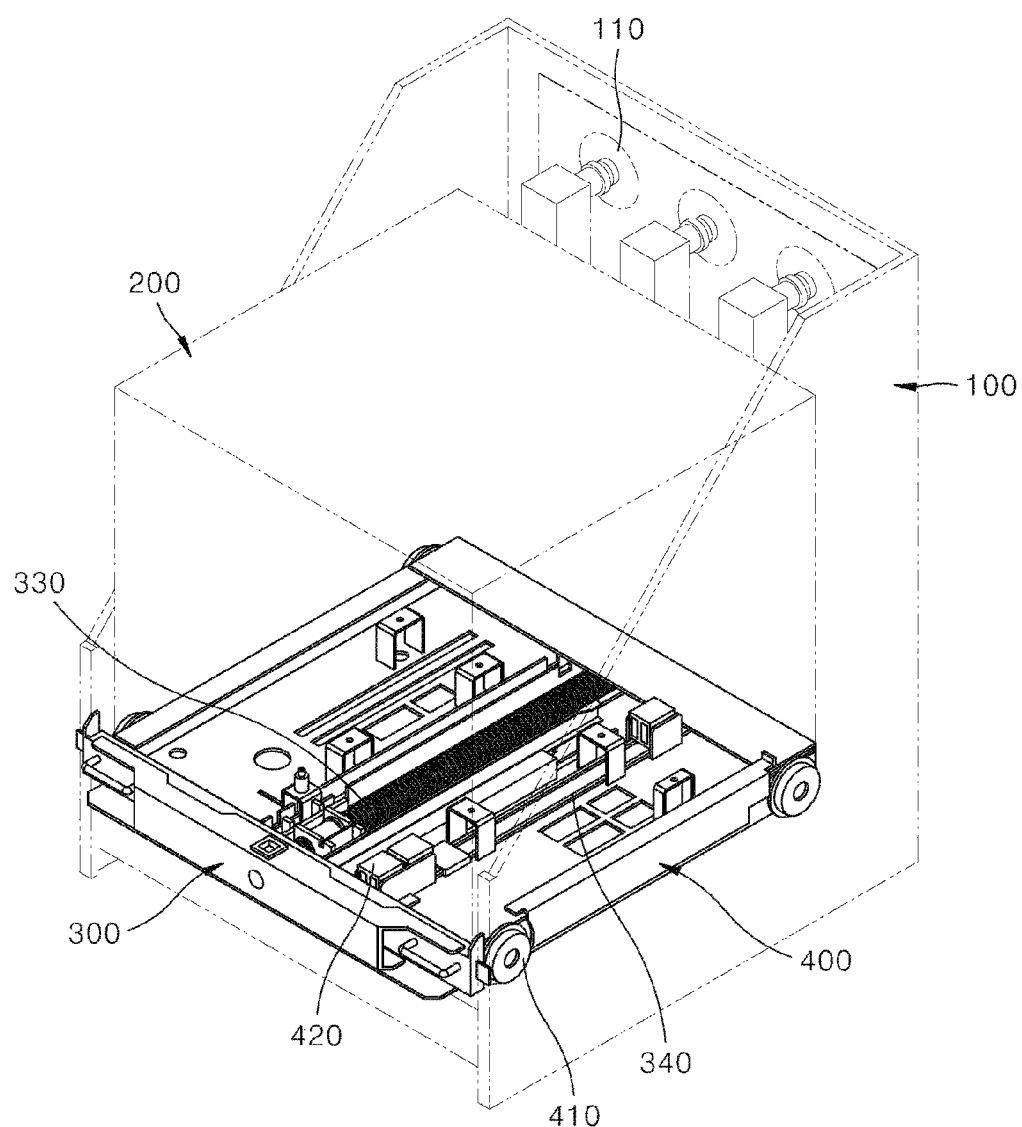
FIG. 1 is a perspective view showing a conventional power device.
Figure 2:
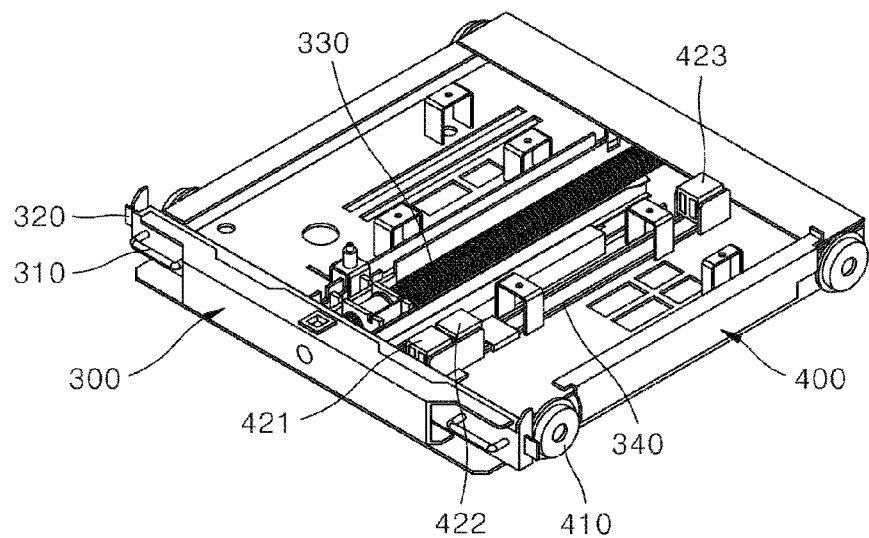
FIG. 2 is a perspective view showing a girder and a truck according to a disconnection position in the conventional power device.
Figure 3:
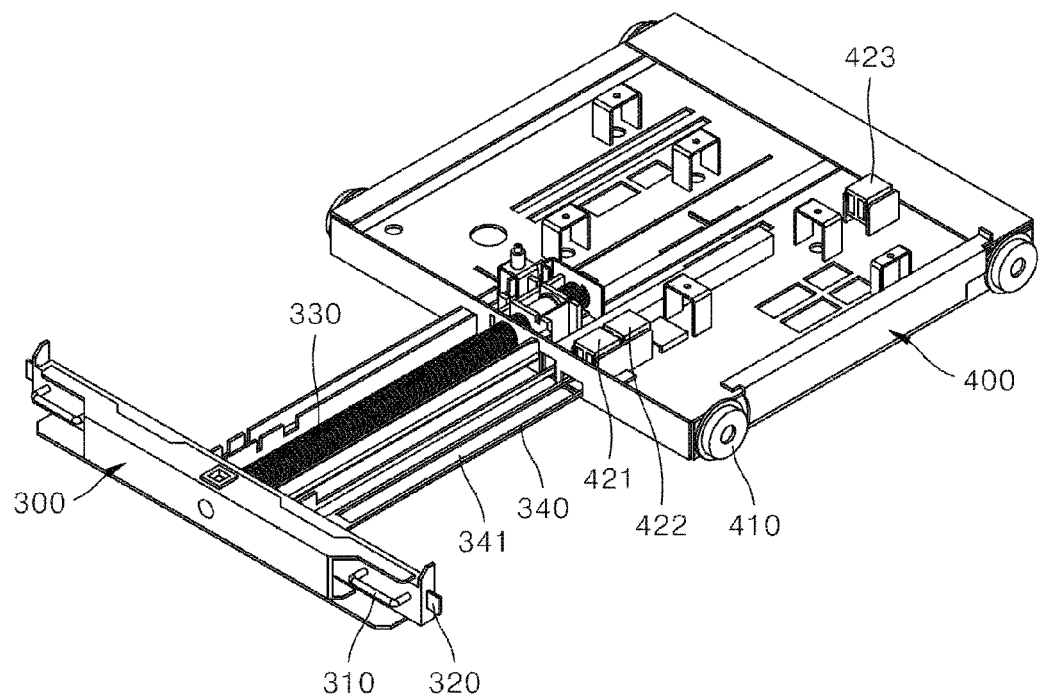
FIG. 3 is a perspective view showing the girder and the truck according to a contact position in the conventional power device.
Figure 4:
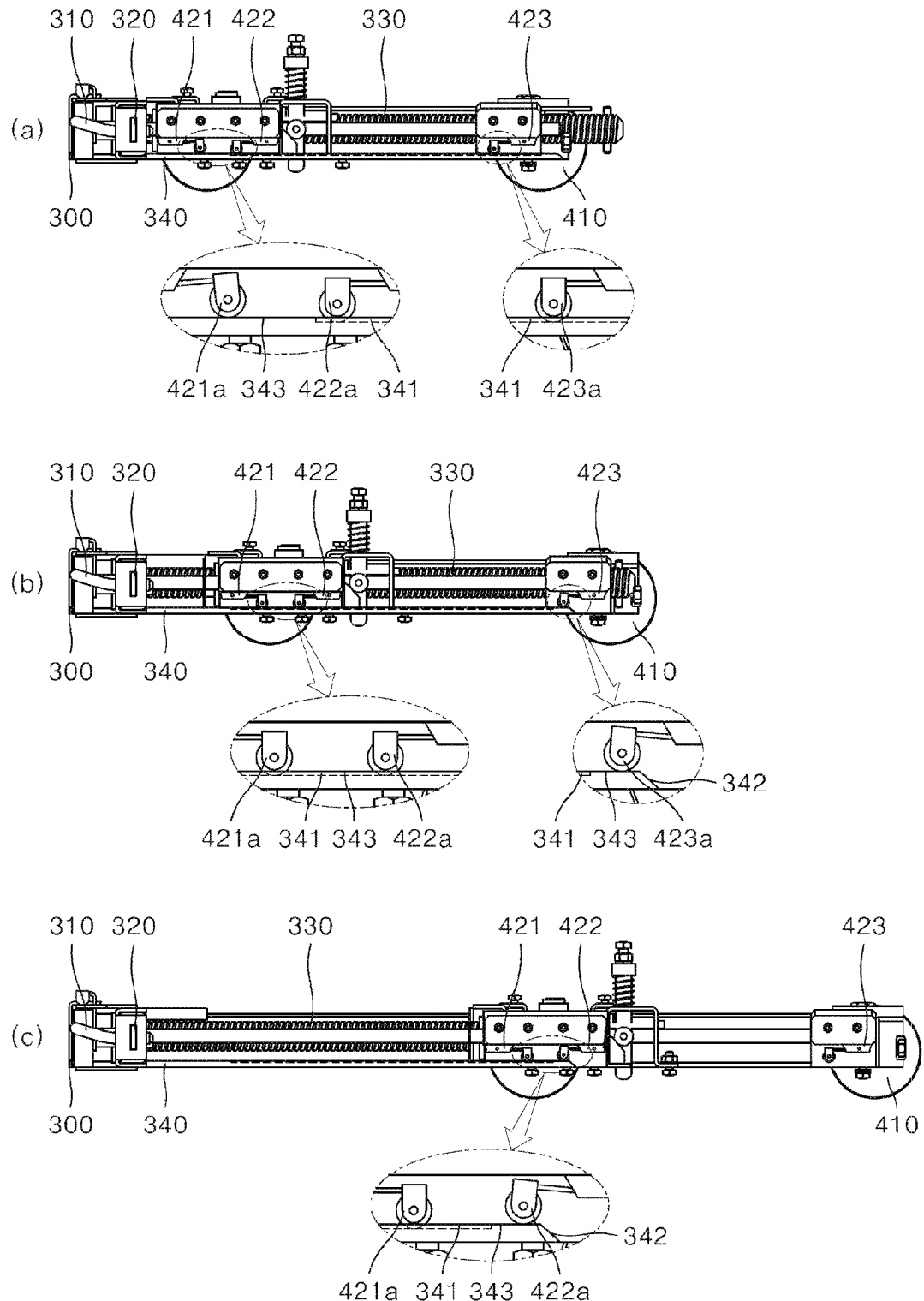
FIG. 4 is a cross-sectional view showing the girder and the truck according to each of the disconnection, test, and contact positions in the conventional power device.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present.

As used herein, the singular forms "a" and "an" are intended to include the plural forms as well, unless the context clearly indicates otherwise.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

As used herein, the term "A and/or B" includes any and all combinations of one or more of A and B unless otherwise specified. When referring to "C to D", this means C inclusive to D inclusive unless otherwise specified.

Hereinafter, a power device for continuously detecting extended and retracted positions of a circuit breaker body according to some embodiments of the present disclosure will be described.

The same reference numerals are allocated to the same components of the power device for continuously detecting the extended and retracted positions of the circuit breaker body according to the present disclosure as those of the conventional power device.

Figure 5:
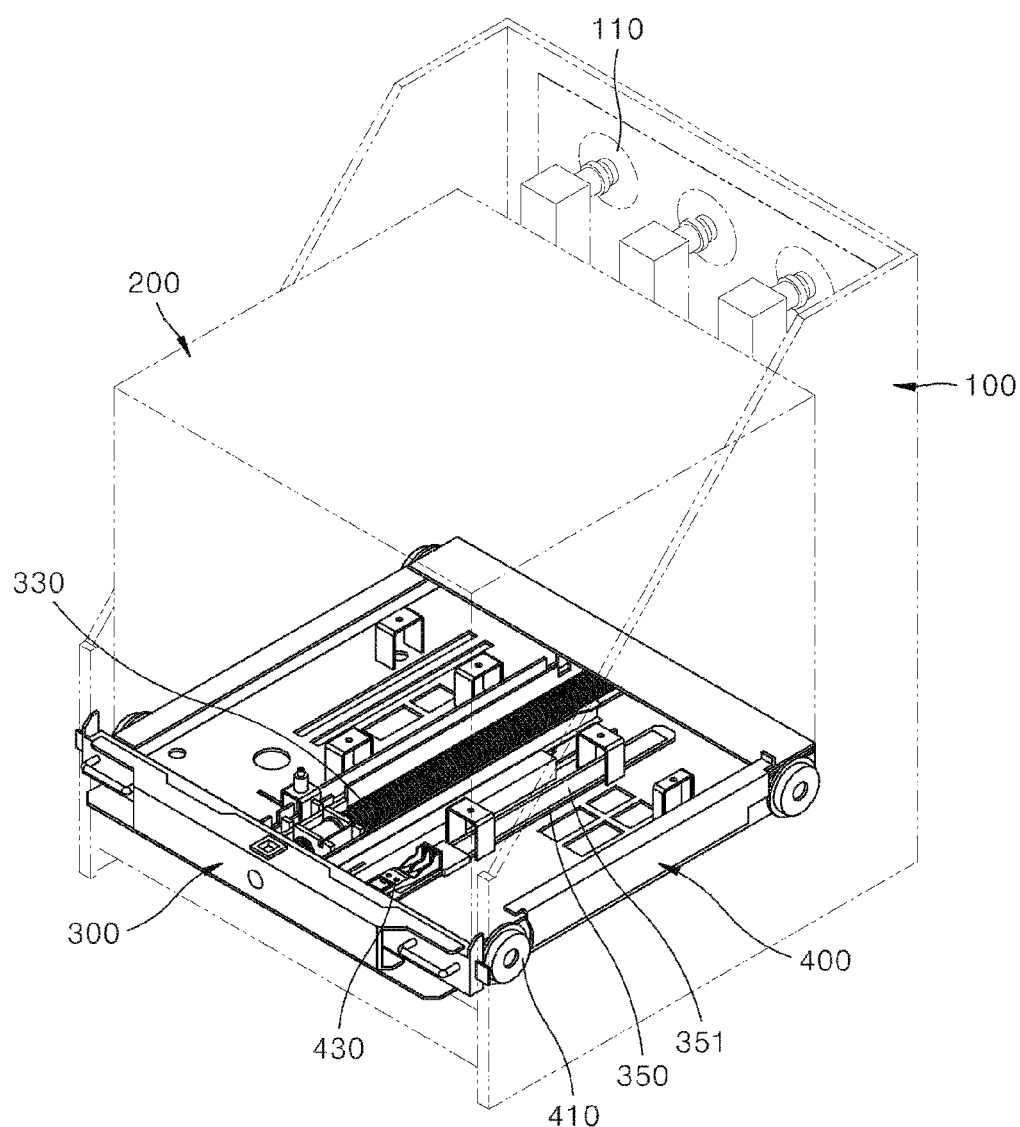
FIG. 5 is a perspective view showing a power device for continuously detecting extended and retracted positions of a circuit breaker body according to an embodiment of the present disclosure.

FIG. 5 is a perspective view showing the power device for continuously detecting the extended and retracted positions of the circuit breaker body according to an embodiment of the present disclosure.

Figure 6:
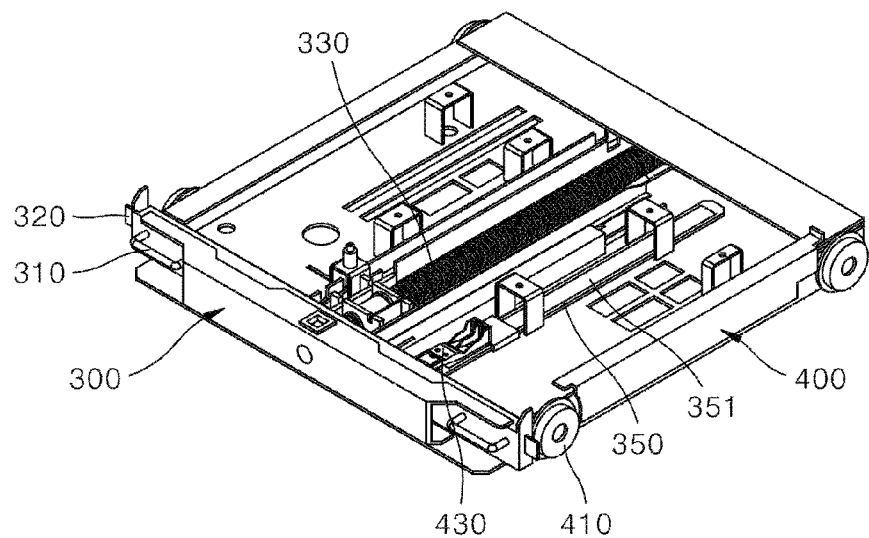
FIG. 6 is a perspective view showing a girder and a truck according to a disconnection position in the power device for continuously detecting the extended and retracted positions of the circuit breaker body according to an embodiment of the present disclosure.
Figure 7:
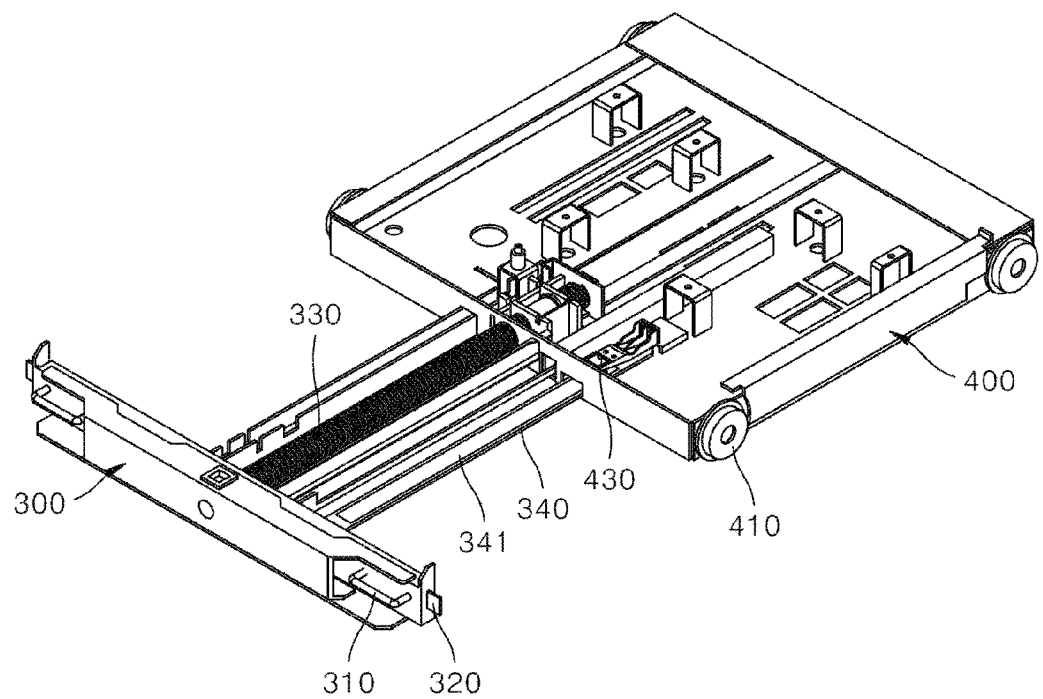
FIG. 7 is a perspective view showing a girder and a truck according to a contact position in the power device for continuously detecting the extended and retracted positions of the circuit breaker body according to an embodiment of the present disclosure.

Further, FIGS. 6 and 7 show perspective views of a girder and a truck according to a disconnection position and a contact position, respectively, in the power device for continuously detecting the extended and retracted positions of the circuit breaker body according to an embodiment of the present disclosure.

Referring to FIG. 5 to FIG. 7, the power device for continuously detecting the extended and retracted positions of the circuit breaker body according to the present disclosure includes the cradle 100 having the cradle terminal 110 connected to a power line connected to an external power source or a load, and fixed to a switchboard, the circuit breaker body 200 that is mechanically and electrically connected to or disconnected from the terminal 110 of the cradle 100, and position detecting means mounted inside the cradle so as to continuously detect a position of the circuit breaker body 200.

More specifically, the power device for continuously detecting the extended and retracted positions of the circuit breaker body according to the present disclosure includes the girder 300 and the truck 400 as a transport device that moves the circuit breaker body 200 to a disconnection or contact position.

More preferably, the circuit breaker body 200 is fixedly mounted to the truck 400. Accordingly, as the truck 400 moves, a spacing between the circuit breaker body 200 and the cradle terminal 110 is adjusted.

In accordance with the present disclosure, the circuit breaker includes the circuit breaker body, 200 the girder 300 and the truck 400.

Further, the disconnection position means a position in which the circuit breaker body 200 is spaced from the cradle terminal 110 by the maximum spacing and thus is electrically disconnected from the cradle terminal 110.

That is, the disconnection position means a state in which the spacing between the girder 300 and the truck 400 is minimized as shown in FIG. 6.

Further, the contact position means a position in which the circuit breaker body 200 approaches the cradle terminal 110 at the maximum level and electrically contacts the terminal 110.

That is, the contact position means a state in which the spacing between the girder 300 and the truck 400 is maximized as shown in FIG. 7.

Further, a test position means a state in which the spacing between the girder 300 and the truck 400 is adjusted in a process in which the body is being displaced from the contact position to the disconnection position or from the disconnection position to the contact position.

The girder 300 includes a pair of handle bars 310 formed on a front face thereof, support ribs 320 respectively formed at both opposing sides thereof, and a spindle 330 having one end rotatably coupled to a center of the front face thereof, and a position bar 350 formed on one side of the spindle 330.

More specifically, the handle bar 310 may refer to a part gripped by an operator when the girder 300 and the truck 400 are mounted to or disconnected from the cradle 100 and be formed in various shapes.

Further, the girder 300 is fixed to the cradle 100 while each of the support ribs 320 is inserted into and fixed to each of both opposing sides of the cradle 100.

Further, the spindle 330 is coupled to the truck 400 such that one end of the spindle is coupled to a central portion of the girder 300 and the other end thereof faces the cradle terminal 110.

In one embodiment of the present disclosure, when the spindle 300 rotates clockwise or counterclockwise, the spacing between the girder 300 and the truck 400 is adjusted.

Further, the position bar 350 includes a position detected area portion 351 corresponding to a moving range of the truck 400.

Further, the position bar extends in a parallel manner to the spindle 330. One end of the position bar 350 is coupled to the girder 300, and the other end thereof is formed as a free end.

In one example, the truck 400 includes a plurality of wheels 410 formed on each of both opposing sides thereof, and a sensor module 430 installed so as to correspond to the position bar 350.

Figure 8:
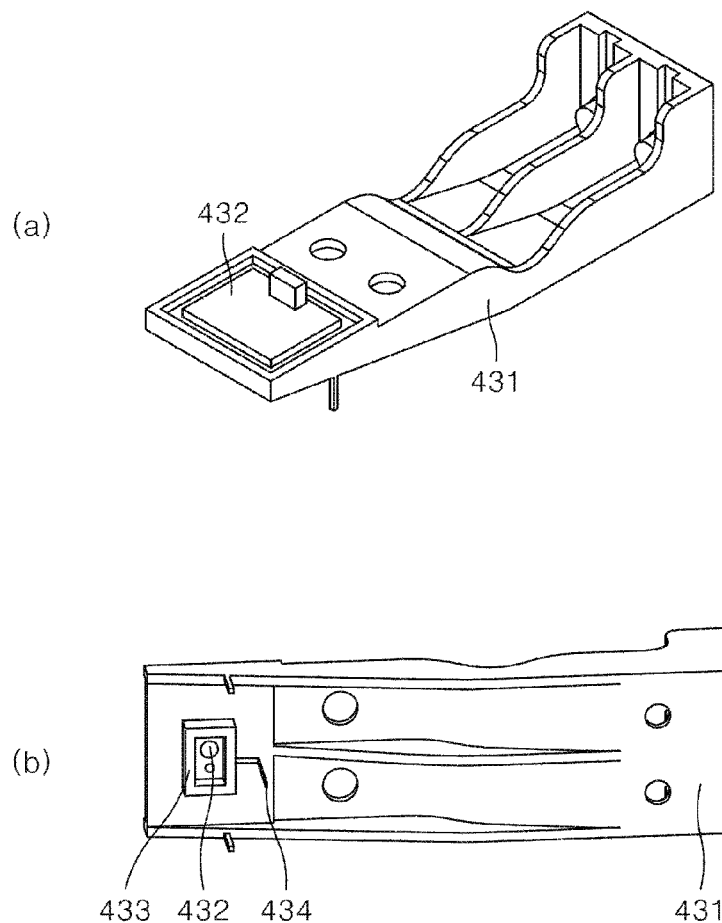
FIG. 8 is a perspective view showing each of a top face and a bottom face of a sensor module in the power device for continuously detecting the extended and retracted positions of the circuit breaker body according to an embodiment of the present disclosure.

FIG. 8 is perspective views showing a top face and a bottom face, respectively, of a sensor module in a power device for continuously detecting the position of a circuit breaker body in extending and retracting motions thereof according to an embodiment of the present disclosure.

Referring to FIG. 8, the sensor module 430 includes a sensor supporter 431 fixedly installed on the truck 400, and a non-contact type sensor 432 coupled to the sensor supporter 431 so as to face the position detected area portion 351.

In this case, the non-contact type sensor 432 may be embodied as each of various sensors capable of detecting a shade of or a distance to the position detected area portion 351 while non-contacting the position detected area portion 351.

More preferably, the non-contact type sensor 432 may be embodied as an optical sensor and may be configured to detect a shade of, a distance to, a shape of, etc. of a predetermined area in the position detected area portion 351.

Accordingly, in the power device for continuously detecting the extended and retracted positions of the circuit breaker body according to the present disclosure, the non-contact type sensor 432 senses a moving distance of the position detected area portion 351 even in the test position corresponding to the process in which the circuit breaker body 200 moves from the contact position to the disconnection position or moves from the disconnection position to the contact position. Thus, in the test position, the position of the circuit breaker body 200 may be detected.

Further, when the non-contact type sensor 432 is an optical sensor, the supporter 431 may include a non-contact type sensor receiving rib 433 protruding downward from an outer peripheral face of the non-contact type sensor 432 in order to minimize a detection error caused by a shade caused by other parts.

Accordingly, the power device for continuously detecting the extended and retracted positions of the circuit breaker body according to the present disclosure may linearly sense and detect the position of the circuit breaker over the entirety of the movement range thereof, such that the accurate position of the circuit breaker body 200 may be detected in real time.

Further, the power device for continuously detecting the extended and retracted positions of the circuit breaker body according to the present disclosure may detect the accurate position of the circuit breaker body 200 using one sensor module 430, compared to the conventional power device, thereby reducing a cost for manufacturing the power device.

Further, in the power device for continuously detecting the extended and retracted positions of the circuit breaker body according to the present disclosure, the physical contact between the components in order to detect the position of the circuit breaker body 200 may be minimized, thereby improving the durability of the power device.

In one example, the sensor module 430 may further include a contact type sensor 434 that is in contact with the position bar 350 via an FPCB (Flexible Printed Circuit Board) or an elastic member.

More specifically, the contact type sensor 434 may be configured to contact the position detected area portion 351, to detect a shape of the position detected area portion 351 and derive the position of the circuit breaker body 200.

Accordingly, in the power device for continuously detecting the extended and retracted positions of the circuit breaker body according to the present disclosure, both the non-contact type sensor 432 and the contact type sensor 434 simultaneously detect the position detected area portion 351 moving in an axial direction of the spindle 330 while the spacing between the girder 300 and the truck 400 is adjusted. Thus, the position of the breaker body 200 may be detected more accurately.

Further, the power device for continuously detecting the extended and retracted positions of the circuit breaker body according to the present disclosure may further include a monitoring unit (not shown). When the positions of the circuit breaker body 200 respectively detected by the plurality of sensors are different from each other, the monitoring unit may generate a notification alarm, etc.

Figure 9:
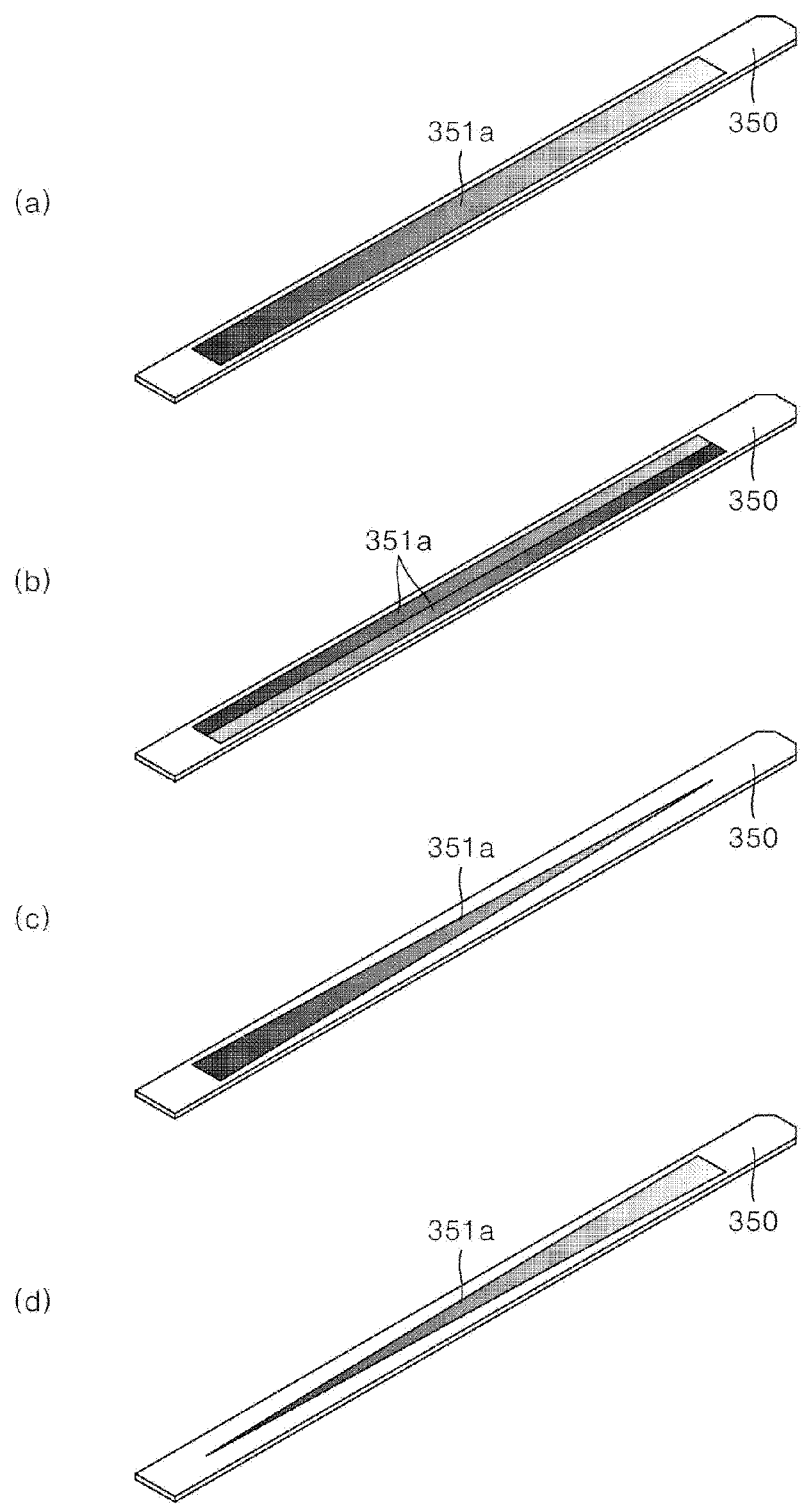
FIG. 9 is a perspective view showing a position bar in the power device for continuously detecting the extended and retracted positions of the circuit breaker body according to an embodiment of the present disclosure.
Figure 10:
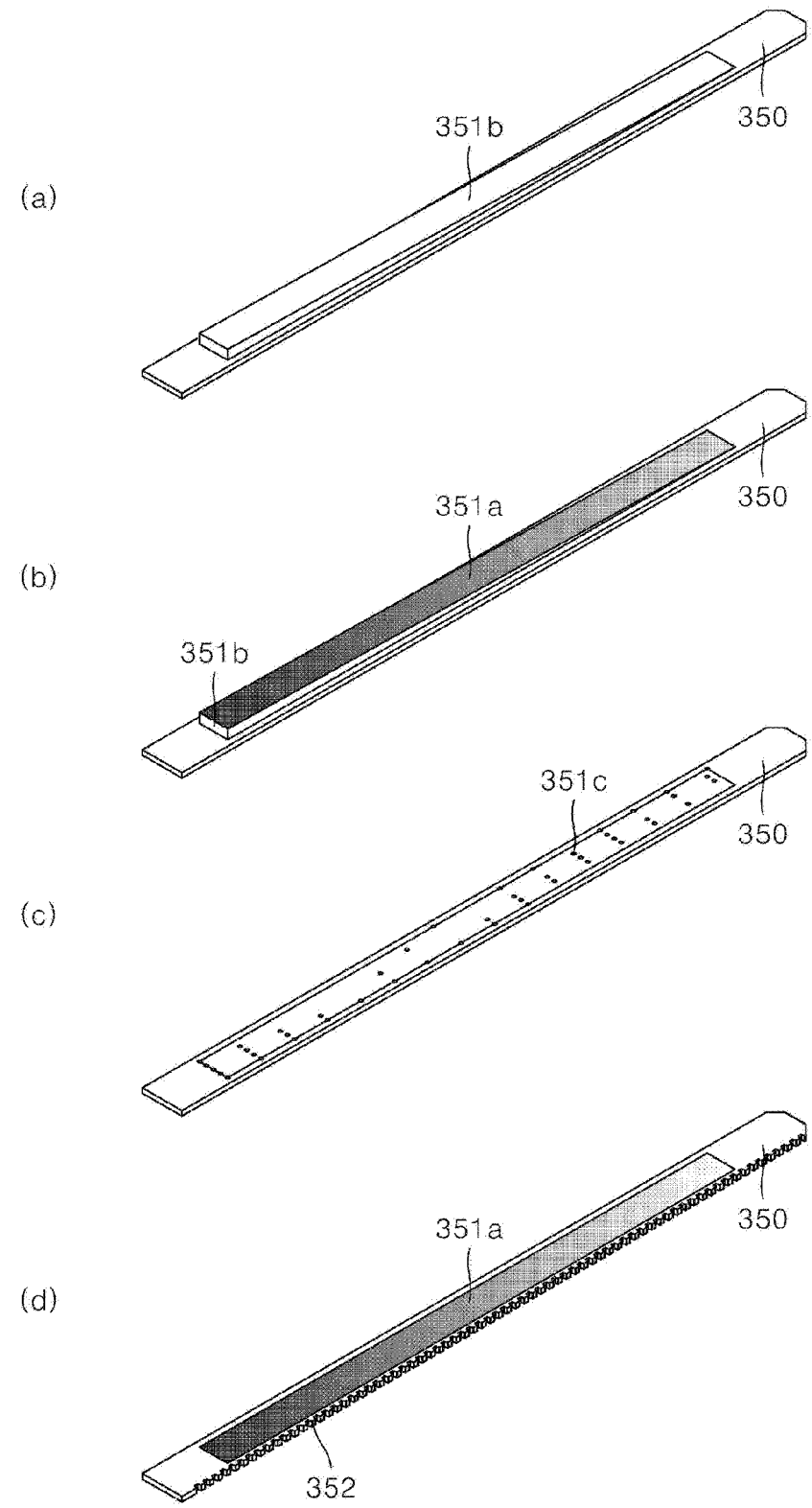
FIG. 10 is a perspective view showing a position bar in the power device for continuously detecting the position of the circuit breaker body in extending and retracting motions according to an embodiment of the present disclosure.

Each of FIG. 9 and FIG. 10 is perspective view of a position bar in the power device for continuously detecting the extended and retracted positions of the circuit breaker body according to an embodiment of the present disclosure.

Various embodiments of the position bar 350 in the power device for continuously detecting the extended and retracted positions of the circuit breaker body according to the present disclosure are described as follows with reference to FIG. 9 and FIG. 10.

The position detected area portion 351 may extend along the movement range of the truck 400 as described above. More preferably, the position detected area portion 351 may be composed of position stickers 351a having different shades and disposed at different positions, such as gradation stickers.

Further, in order to prevent the position sticker 351a from protruding from a top face of the position bar 350 due to its thickness, the position detected area portion 351 may have a groove defined therein whose a depth is equal to or larger than the thickness of the position sticker 351a.

Further, the position sticker 351a may be formed as a gradation tape configured so that a portion thereof adjacent to the girder 300 is darker while a portion adjacent to the cradle terminal 110 is brighter as shown in (a) of FIG. 9.

Alternatively, the position sticker 351a may be formed as a gradation tape configured so that a portion thereof adjacent to the girder 300 is brighter while a portion adjacent to the cradle terminal 110 is darker.

In one example, an area of the position sticker 351a may be divided into two areas arranged along a width direction of the position bar 350 as shown in (b) of FIG. 9. In one area of the two areas, a portion thereof adjacent to the girder 300 is darker while a portion adjacent to the cradle terminal 110 is brighter. In the other area of the two areas, a portion thereof adjacent to the girder 300 is brighter while a portion adjacent to the cradle terminal 110 is darker.

In this regard, it is preferable that two sensors are installed to respectively face the two areas of the position stickers 351a.

Further, the position sticker 351a may be formed as a gradation tape having an area size varying along the longitudinal direction of the position bar 350. For example, the gradation tape may have a triangle shape, as shown in each of (c) and (d) of FIG. 9.

In one example, the position detected area portion 351 may be formed as a position inclined portion 351b as shown in (a) of FIG. 10.

More specifically, the position inclined portion 351b is formed such that a distance between a top face of the position inclined portion 351b and the sensor module 430 varies as the position bar 350 extends in the axial direction of the spindle 330.

Accordingly, the position inclined portion 351b may be formed to protrude upwardly beyond the top face of the position bar 350 except for the position detected area portion 351 as shown in (a) of FIG. 10. Alternatively, the position inclined portion 351b may be formed to be recessed downwardly beyond the top face of the position bar 350 except for the position detected area portion 351.

Further, a gradation tape may be attached to a top face of the position inclined portion 351b as shown in (b) of FIG. 10.

In one example, the position detected area portion 351 may include a plurality of position protrusions 351c arranged and spaced apart from each other by a predetermined spacing as shown in (c) of FIG. 10.

More preferably, a plurality of groups of the position protrusions 351c are arranged in the longitudinal direction of the position bar 350, wherein each group is composed of the position protrusions 351c arranged in the width direction of the bar 350. In this regard, the numbers or formation positions of the position protrusions 351c in the different groups of the position protrusions 351c may be different from each other.

Further, the position detected area portion 351 may be formed as a gradation tape on which the position protrusions 351c are formed.

Further, the position detected area portion 351 may be embodied as a combination of the position sticker 351a, the position inclined portion 351b, and the position protrusions 351c.

In one example, the position bar 350 may have a position sun gear 352 formed on one side face of the position detected area portion 351.

Figure 11:
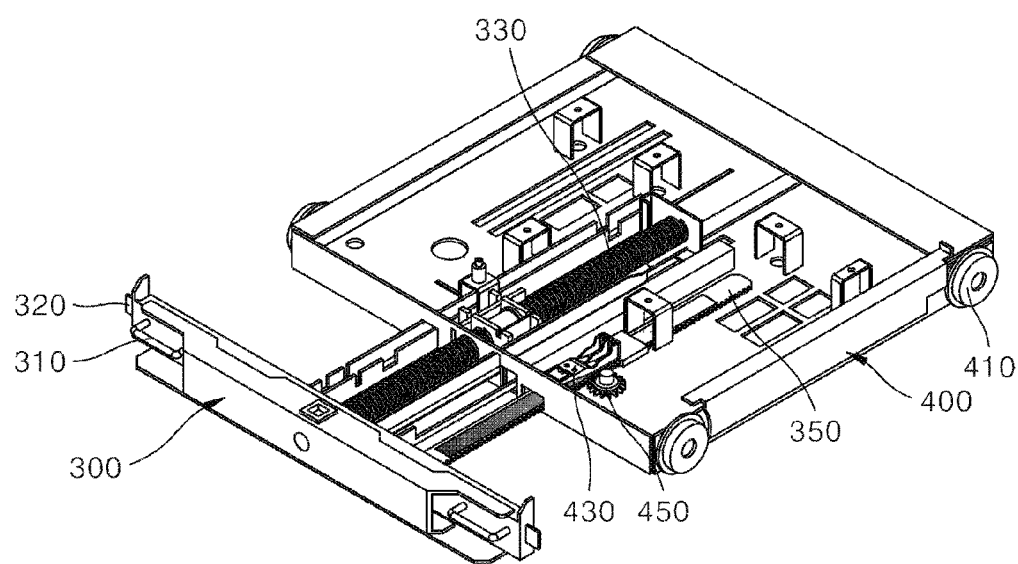
FIG. 11 is a perspective view showing a girder and a truck according to a test position in the power device for continuously detecting the extended and retracted positions of the circuit breaker body according to an embodiment of the present disclosure.

FIG. 11 is a perspective view showing a girder and a truck according to the test position in the power device for continuously detecting the extended and retracted positions of the circuit breaker body according to an embodiment of the present disclosure.

Referring to (d) of FIG. 10 and FIG. 11, in the power device for continuously detecting the extended and retracted positions of the circuit breaker body according to the present disclosure, the truck 400 may have a rotary gear 450 which may be engaged with the position sun gear 352 so as to rotate.

Further, a sensor capable of detecting the number of rotations and a rotation angle of the rotary gear 450 and thus detecting the position of the circuit breaker body 200 based on the detected number and angle may be further installed in the truck 400.

Further, the power device for continuously detecting the extended and retracted positions of the circuit breaker body according to the present disclosure may further include a sensor which may detect the number of rotations and a rotation angle of the wheel 410 and detect the position of the circuit breaker body 200 based on the detected number and angle.

Figure 12:
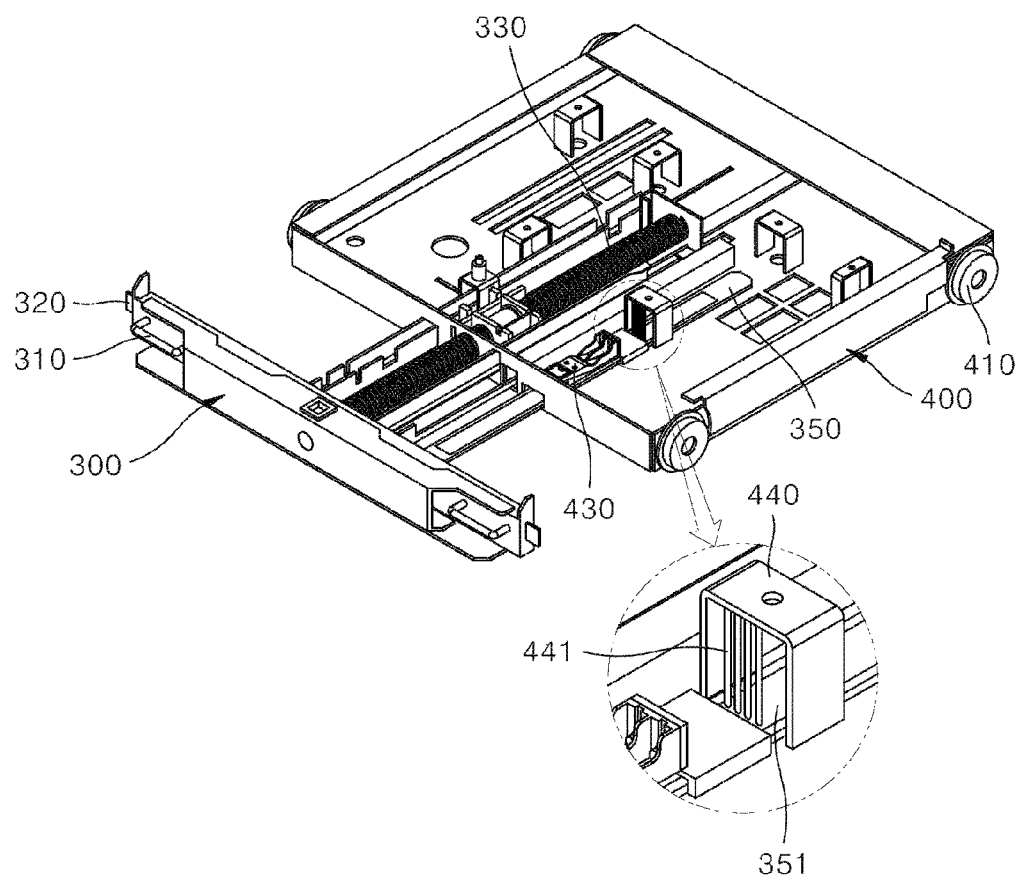
FIG. 12 is a perspective view showing a girder and a truck according to the test position in the power device for continuously detecting the extended and retracted positions of the circuit breaker body according to an embodiment of the present disclosure.

FIG. 12 is a perspective view showing a girder and a truck according to the test position in a power device for continuously detecting the extended and retracted positions of the circuit breaker body according to an embodiment of the present disclosure.

Referring to FIG. 12, in the power device for continuously detecting the extended and retracted positions of the circuit breaker body according to the present disclosure, the truck 400 may include a plurality of position bar guides 440 formed to be adjacent to or in contact with both opposing sides of the position bar 350.

Further, the position bar guide 440 may include a position bar cleaner 441 formed to remove dust or foreign substances deposited on the top face of the position bar 350.

The position bar cleaner 441 may be formed in a form of a brush. While the cleaner is in contact with the top face of the position detected area portion 351, the position bar 350 moves, such that the dust or foreign matter deposited on the position detected area portion 351 may be removed by the position bar cleaner 441, thereby minimizing a detection error of the sensor module 430 due to the dust or foreign matter.

The present disclosure has been described above with reference to the illustrated drawings. However, the present disclosure is not limited to the embodiments and drawings disclosed in the present specification. It is obvious that various modifications may be made by those skilled in the art within the scope of the technical idea of the present disclosure. In addition, although effects according to the configurations of the present disclosure are not explicitly described while describing the embodiments of the present disclosure, the predictable effects from the configurations should also be appreciated.

What is claimed is:

1. A power device for continuously detecting each of extended and retracted positions of a circuit breaker body, the device comprising:
   a cradle having a cradle terminal formed on a rear face thereof;
   a circuit breaker mechanically and electrically connected to or disconnected from the cradle terminal; and
   a position detector mounted inside the circuit breaker configured to detect a position of the circuit breaker body in real time, by linearly detecting the position over an entirety of a movement range of the circuit breaker body.

2. The device of claim 1, wherein the position detector includes:
   a position bar including at least one position detected area portion corresponding to the movement range of the circuit breaker body, wherein the position bar has one end coupled to a girder fixedly installed on a front face of the cradle, and the other end as a free end facing a rear side of the cradle; and
   a sensor module installed inside a truck, wherein the circuit breaker body is loaded on the truck, and the position bar is inserted into the truck, wherein the truck is configured to reciprocate from the girder to the cradle terminal and inside the cradle, wherein the sensor module includes at least one sensor facing the position detected area portion.

3. The device of claim 2, wherein the position detected area portion includes at least one:

at least one position sticker having a shade varying in a longitudinal direction of the position bar;

at least one position inclined portion inclined downwardly or upwardly in the longitudinal direction of the position bar; or a plurality of groups of position protrusions arranged in the longitudinal direction of the position bar, wherein each group is composed of position protrusions arranged in a width direction of the bar, wherein numbers or formation positions of the position protrusions in the different groups are different from each other.

4. The device of claim 2, wherein the at least one sensor includes at least one of a non-contact type sensor or a contact type sensor, or includes a non-contact type sensor and a contact type sensor and thus includes at least two sensors.

5. The device of claim 2, wherein a position sun gear is formed on and along one side face of the position bar, wherein the truck receives therein a rotary gear rotating while being in engagement with the position sun gear, wherein the device further comprises a sensor for sensing a number of rotations or a rotation angle of the rotary gear and for determining the position of the circuit breaker based on the sensed number or angle.

6. The device of claim 2, wherein the truck receives therein at least one position bar guide adjacent to or in contact with each of both opposing sides of the position bar, wherein the position bar guide includes a position bar cleaner constructed to remove dust or foreign substances deposited on the position detected area portion.

\* \* \* \* \*